(12) United States Patent
Mehl

(10) Patent No.: US 9,175,829 B2
(45) Date of Patent: Nov. 3, 2015

(54) ILLUMINATION APPARATUS WITH PHOSPHOR WHEEL

(71) Applicant: OSRAM GmbH, Munich (DE)

(72) Inventor: Oliver Mehl, Berlin (DE)

(73) Assignee: OSRAM GmbH, Munich (DE)

( * ) Notice: Subject to any disclaimer, the term of this patent is extended or adjusted under 35 U.S.C. 154(b) by 126 days.

(21) Appl. No.: 13/950,327

(22) Filed: Jul. 25, 2013

(65) Prior Publication Data

US 2014/0029237 A1    Jan. 30, 2014

(30) Foreign Application Priority Data

Jul. 25, 2012  (DE) .......................... 10 2012 213 036

(51) Int. Cl.
| | |
|---|---|
| *F21V 9/16* | (2006.01) |
| *F21V 9/08* | (2006.01) |
| *F21V 14/08* | (2006.01) |
| *F21S 10/00* | (2006.01) |
| *H04N 9/31* | (2006.01) |
| *G03B 21/20* | (2006.01) |

(52) U.S. Cl.
CPC ................ *F21V 9/08* (2013.01); *F21S 10/007* (2013.01); *F21V 14/08* (2013.01); *G03B 21/204* (2013.01); *H04N 9/31* (2013.01); *H04N 9/3114* (2013.01)

(58) Field of Classification Search
CPC ............... F21V 9/08; F21V 9/10; F21V 9/16; F21V 14/08; F21V 13/08; F21S 10/007; F21Y 2101/025; H04N 9/3161; G02B 21/204
USPC ........................................ 362/84, 293; 353/84
See application file for complete search history.

(56) References Cited

U.S. PATENT DOCUMENTS

| | | | | |
|---|---|---|---|---|
| 2009/0034284 | A1* | 2/2009 | Li et al. .......................... | 362/554 |
| 2011/0242495 | A1* | 10/2011 | Chen et al. ..................... | 353/31 |
| 2012/0033185 | A1* | 2/2012 | Chang ............................. | 353/33 |
| 2012/0062857 | A1 | 3/2012 | Saitou et al. | |
| 2012/0201030 | A1* | 8/2012 | Yuan et al. ..................... | 362/293 |
| 2012/0243205 | A1* | 9/2012 | Lin ................................. | 362/84 |
| 2013/0100644 | A1* | 4/2013 | Hu et al. ........................ | 362/84 |

FOREIGN PATENT DOCUMENTS

| | | |
|---|---|---|
| DE | 102011004574 A1 | 8/2012 |
| WO | 2012113644 A1 | 8/2012 |

* cited by examiner

*Primary Examiner* — Peggy Neils

(57) ABSTRACT

Various embodiments propose an illumination apparatus having a laser apparatus and a phosphor wheel, wherein the phosphor wheel has, in addition to at least one phosphor region for phosphor conversion, at least one transmission region for colored light having a second, greater dominance wavelength from a light source. The beam paths from light source and laser apparatus are e.g. arranged collinearly, wherein the phosphor wheel rotates into the common optical axis of the laser apparatus and light source. By adding colored light having a greater dominance wavelength, the dominance wavelength of a colored light channel that is required for projection applications can also be obtained with colored light converted using efficient phosphor having a dominance wavelength that is too small.

20 Claims, 4 Drawing Sheets

ILLUMINATION APPARATUS WITH PHOSPHOR WHEEL

CROSS-REFERENCE TO RELATED APPLICATION

This application claims priority to German Patent Application Serial No. 10 2012 213 036.5, which was filed Jul. 25, 2012, and is incorporated herein by reference in its entirety.

TECHNICAL FIELD

Various embodiments relate to an illumination apparatus having a laser apparatus and a phosphor wheel arranged in the beam path of the laser apparatus. Various embodiments furthermore relate to a method for operating a corresponding illumination apparatus.

BACKGROUND

Light sources having high light flux and high luminance are employed in a wide variety of fields, for instance in endoscopy as well as in projection appliances, for which purpose gas discharge lamps are currently most widespread. In the case of illumination applications, for example projection or endoscopy, based on LARP ("Laser Activated Remote Phosphor") technology which is known in principle, a phosphor is excited by a laser which is arranged remotely from the latter. In this case, the laser radiation which strikes the phosphor is at least partially converted by the phosphor by means of wavelength conversion into wavelength-converted useful light.

Rotating phosphor wheels are typically used as phosphors in order to distribute the laser beam output of the incident laser radiation averaged over time over a larger surface area and thus to reduce the phosphor degradation. A phosphor wheel has at least one sector that is coated with a phosphor. The sector may be a circular sector or a circular ring sector. A plurality of sectors may be arranged sequentially, radially and/or in circumferential direction on one side of the phosphor wheel. The sectors are typically coated with different phosphors which convert the incident laser radiation, for example ultraviolet (UV) radiation or blue-violet light, into radiation in another wavelength range, for example to light in the red (red phosphor), yellow (yellow phosphor), green (green phosphor) or blue (blue phosphor) wavelength range. The temporally sequential colored light channels for supplying an imaging unit, which are necessary for video projection, can also be produced using the successive color phosphor sectors of the rotating color wheel.

The light which is wavelength-converted by the phosphors is typically collected using an optical apparatus, for example reflector, converging lens or TIR optics (TIR: Total Internal Reflection; for example conical glass rod) and used further for the particular application.

One disadvantage is that red phosphors, in contrast to yellow and green phosphors, have a lower conversion efficiency when they are irradiated with laser radiation with high surface power densities (for example 10-50 W/mm$^2$) As a result, in particular for red light, the light flux and luminance which can be achieved using LARP technology are limited. In addition, a few efficient phosphors have dominance wavelengths, which are not optimum for some applications, in particular video projection. The dominance wavelength (also referred to as dominant wavelength) is defined by light of a light color (colored light) in the CIE color diagram (standard color table) by the point of intersection of the straight line which is extended from the white point over the ascertained color locus of the colored light with the spectral locus at the closest edge of the CIE color diagram. Efficient red phosphors, for example, have only a dominance wavelength of about 600 nm. However, for projection uses, red light with a dominant wavelength in the range of approximately 600 to 620 nm is typically needed.

SUMMARY

Various embodiments propose an illumination apparatus having a laser apparatus and a phosphor wheel, wherein the phosphor wheel has, in addition to at least one phosphor region for phosphor conversion, at least one transmission region for colored light having a second, greater dominance wavelength from a light source. The beam paths from light source and laser apparatus are e.g. arranged collinearly, wherein the phosphor wheel rotates into the common optical axis of the laser apparatus and light source. By adding colored light having a greater dominance wavelength, the dominance wavelength of a colored light channel that is required for projection applications can also be obtained with colored light converted using efficient phosphor having a dominance wavelength that is too small.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
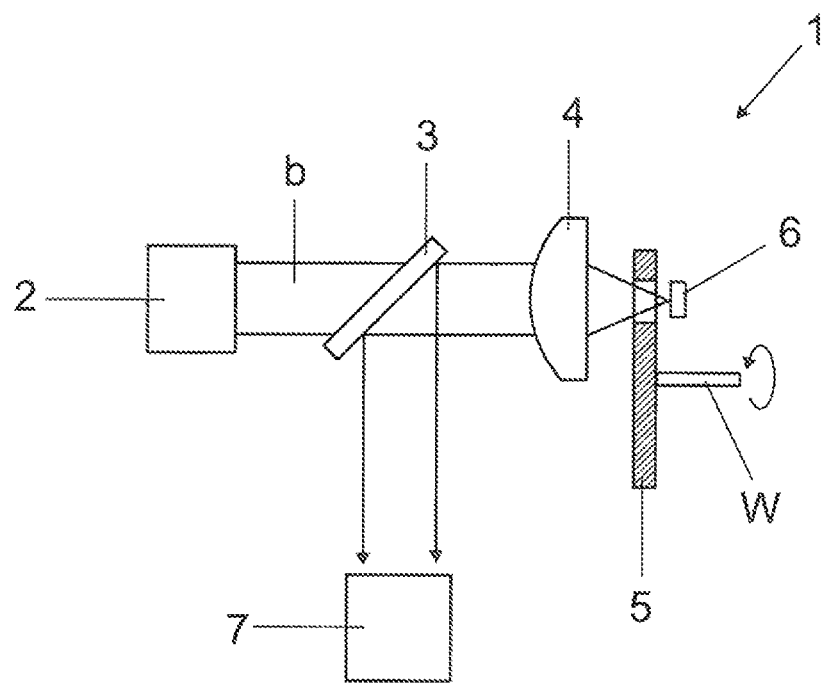
FIG. 1 shows an illumination apparatus according to a first embodiment having a rotatable phosphor wheel.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments may be used e.g. in projection apparatuses, for example for film and video projection, in industrial and medical image recognition, in technical and medical endoscopy, for light effects in the entertainment industry, for medical irradiation and in the automotive sector, e.g. for headlights in motor vehicles.

Various embodiments may improve an illumination apparatus. One aspect here may be to achieve the dominance wavelength of a colored light channel required for projection applications even when efficient phosphors are used.

Various embodiments provide an illumination apparatus having a phosphor wheel having a first and a second side, wherein the first side has a phosphor region, and wherein the phosphor wheel has a transmission region, a laser apparatus for irradiating at least part of the phosphor region on the first side of the phosphor wheel with laser radiation, wherein the phosphor region has a phosphor which can be irradiated by the laser radiation and re-emits said laser radiation, at least partially wavelength-converted to colored light having a first dominance wavelength, a light source for irradiating the transmission region with colored light having a second dominance wavelength, and wherein the second dominance wavelength is greater than the first dominance wavelength.

Furthermore, various embodiments provide a method for operating the apparatus.

Various embodiments are based on the finding that some phosphors for producing colored light, e.g. red phosphors, with high conversion efficiency have a dominance wavelength which is too small in particular for projection applications.

One aspect of various embodiments is to supplement the colored light of a laser-excited phosphor which is characterized by its dominance wavelength with a further colored light from a light source, e.g. a light emitting diode (LED), wherein the dominance wavelength of this colored light is greater than the dominance wavelength of the light produced using phosphor conversion.

By this targeted adding of colored light having a dominance wavelength that is greater than that of the colored light of an efficient phosphor, mixed light with a greater dominance wavelength than that of the initial colored light of the efficient phosphor is obtained. In this manner, efficient phosphors with dominance wavelengths which are too small per se can also be used, among others, for projection applications. The dominance wavelength of the mixed light is set appropriately by adding colored light having a dominance wavelength that is appropriately great for the particular application. In this context, it has proven advantageous if the dominance wavelength of the added colored light is at least 1 nm and at most 50 nm, e.g. at least 10 nm and at most 30 nm, greater than the dominance wavelength of the particular colored light produced using phosphor conversion. For red light produced using red phosphor conversion, light from an LED having an emission wavelength of 618 nm, for example, is suitable for being added. Alternatively, an LED having an emission wavelength of 638 nm can be used.

The addition takes place in terms of time after the phosphor conversion, either directly afterwards or after an intermediate phase. Owing to the ratio of the duration of the phosphor conversion (phase of the colored light having a first dominance wavelength) to the duration and intensity of the added colored light (phase of the colored light having a second dominance wavelength), their respective influence on the light flux or the wavelength correction for the human eye can be controlled.

For this purpose, the illumination apparatus according to various embodiments may include a phosphor wheel which has, in addition to at least one phosphor region for the phosphor conversion (phase of the colored light having a first dominance wavelength), at least one transmission region for the added colored light (phase of the colored light having a second dominance wavelength). For the colored light having the second dominance wavelength, a corresponding light source, e.g. LED, is provided. The LED is arranged such that the colored light emitted by it can travel through the transmission region of the phosphor wheel.

In various embodiments of the illumination apparatus, a dichroic mirror is provided for coupling out the colored light (first dominance wavelength) produced using phosphor conversion. To this end, the dichroic mirror has a high reflectance for the colored light having the first dominance wavelength (colored light produced using phosphor conversion), but a high transmittance for the laser radiation. In addition, the dichroic mirror is arranged in the beam path of the radiation emitted by the laser apparatus between the laser apparatus and the phosphor wheel. In various embodiments, the dichroic mirror is arranged such that the angle of incidence of the laser radiation emitted by the laser apparatus is between 30° and 60°, e.g. 45°. In this way, it is possible to realize a particularly compact structure of an illumination apparatus according to various embodiments.

The light source provided for the adding may be arranged such that the colored light emitted by it having the second dominance wavelength is incident, through the transmission region of the phosphor wheel, on the mentioned dichroic mirror. To this end, the light source and the laser apparatus are arranged in a common optical axis, into which the phosphor wheel intrudes. While the laser apparatus radiates onto the first side of the phosphor wheel, that is to say the side with the phosphor region, the light source radiates onto the opposite, second side of the phosphor wheel. This collinear optical arrangement may have the advantage that the mentioned dichroic mirror cannot only be used for coupling out the colored light (first dominance wavelength) produced by the phosphor conversion, but also for coupling out the colored light from the light source (second dominance wavelength). To this end, the dichroic mirror is adapted such that it has high reflection also for the added colored light (second dominance wavelength).

The transmission region may be made of a material which is transparent for the colored light from the light source or formed by a cutout in the phosphor wheel, for example a slit-type opening. The cutout may have the shape of a circular ring segment. The transmission region may also consist of more than one part.

The light source for adding colored light having a greater dominance wavelength is e.g. at least one LED (Light Emitting Diode). LEDs without phosphor conversion may have the advantage that they emit relatively narrowband radiation (exception superluminescence LED), that is to say their dominance wavelength approximately corresponds to their emission wavelength. The LED can be arranged very closely to the phosphor wheel such that the colored light emitted by it having the second dominance wavelength can travel through the cutout which rotates past it. Alternatively, an optical system can be provided between light source and phosphor wheel, which optical system images the light-emitting surface of the light source into the plane of the phosphor wheel.

The laser apparatus may include e.g. at least one semiconductor laser, e.g. a diode laser or laser diode. It is also possible to operate a plurality of laser diodes which are of the same type and/or different in groups, for example as stacks ("laser stack") or matrix.

A focusing apparatus, which is arranged between the dichroic mirror and the phosphor wheel, may be provided in the beam path of the laser radiation emitted by the laser apparatus. The focusing apparatus focuses the laser radiation from the laser apparatus onto the phosphor region of the phosphor wheel that rotates past it. In addition, the focusing apparatus collects the colored light which has been wavelength-converted and scattered back by the phosphor of the phosphor region and guides it to the dichroic mirror to be coupled out. The phosphor wheel may also have one or more further phosphor regions with mutually different phosphors so as to be able to produce light with additional light colors using phosphor conversion. In addition, a plurality of in each case monochromatic illumination apparatuses with suitable addition can also be connected in a modular fashion in parallel so as to produce multichromatic light.

For further details and configurations for adding colored light having a greater dominance wavelength than the dominance wavelength of the colored light produced using phosphor conversion, reference is made to the following implementations. The design possibilities, features and their advantages described for the illumination apparatus according to various embodiments apply similarly, if applicable, also to the method according to various embodiments.

Identical reference numerals in different embodiments below designate identical or similar features.

Figure 2:
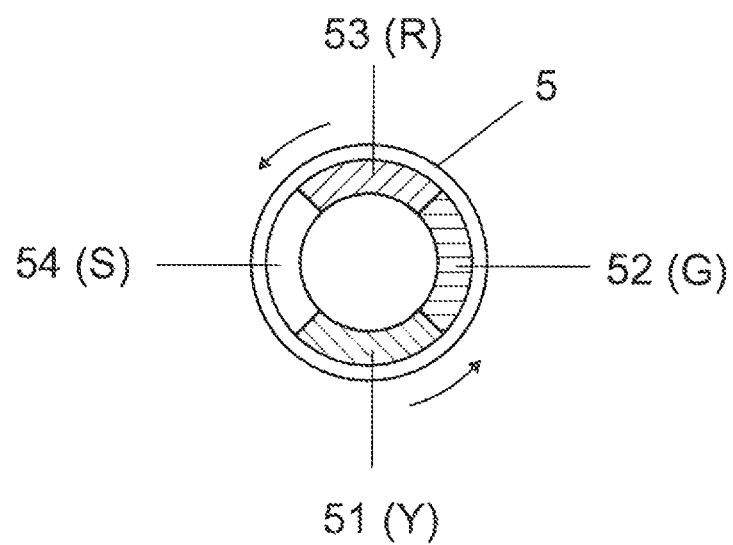
FIG. 2 shows a plan view of a possible embodiment of the phosphor wheel of the illumination apparatus from FIG. 1.

FIG. 1 shows a schematic diagram in side view of a first embodiment of an illumination apparatus 1 according to various embodiments. It includes a laser apparatus 2, for example a laser diode matrix consisting of 4 by 5 laser diodes with in each case 1 Watt of laser beam power, which laser apparatus 2 emits blue laser radiation b having an emission wavelength of, for example, approximately 460 nm. The blue laser radiation b travels through a dichroic mirror 3, which has high transmission for wavelengths of less than 475 nm, but high reflection for wavelengths of greater than 475 nm. After passing through the dichroic mirror 3, the laser radiation b strikes a focusing apparatus 4, for example a converging lens, which focuses the laser radiation b onto a phosphor wheel 5. FIG. 2 shows, in plan view, a possible embodiment of the phosphor wheel 5. The phosphor wheel 5 is rotatable about an axis of rotation W (for the sake of clarity, a motor having a rotary bearing etc., which is necessary therefor, is not illustrated), as indicated by the curved arrow, and in its core consists of a thin circular metal disk. On the side facing the laser apparatus 2, the phosphor wheel 5 has three luminous regions 51, 52 and 53, which, as neighboring ring segments, form a ring that is concentric with respect to the axis of rotation W. Said ring is made complete by a transmission region 54 in the form of a slit. The first luminous region 51 is covered by a first phosphor layer Y, the second luminous region 52 is covered by a second phosphor layer G, and the third luminous region 53 is covered by a third phosphor layer R. The respective phosphor layer 51 to 53 converts the blue laser radiation b from the laser apparatus 2 with high conversion efficiency, for example of more than 95%, to yellow (yellow phosphor Y), green (green phosphor G) or red light (red phosphor R) by way of "down conversion". On the side of the phosphor wheel 5 facing away from the laser apparatus 2, a red LED 6 (Light Emitting Diode) is arranged with as small a distance as possible (typically a few mm) In the present case, this is the LED Q6WP (OSRAM company) of the InGaAlP type having a dominance wavelength of 618 nm. The red LED 6 may be arranged such that the red light, given a suitable rotational phase of the phosphor wheel 5, can travel through the slit 54 and strikes the dichroic mirror 3. To this end, the chief ray direction of the red LED 6 is oriented to be collinear with respect to the beam path of the blue laser radiation and thus defines an optical axis of the illumination apparatus 1. The dichroic mirror 3 is tilted by 45° with respect to this optical axis. As a result, the dichroic mirror 3 reflects the red light from the red LED 6 perpendicular to the optical axis for further use in an optical integrator 7, for example a TIR rod or another optical system, as applicable. For further explanation of the operation of the illumination apparatus 1, reference is also made below to FIG. 3.

Figure 3:
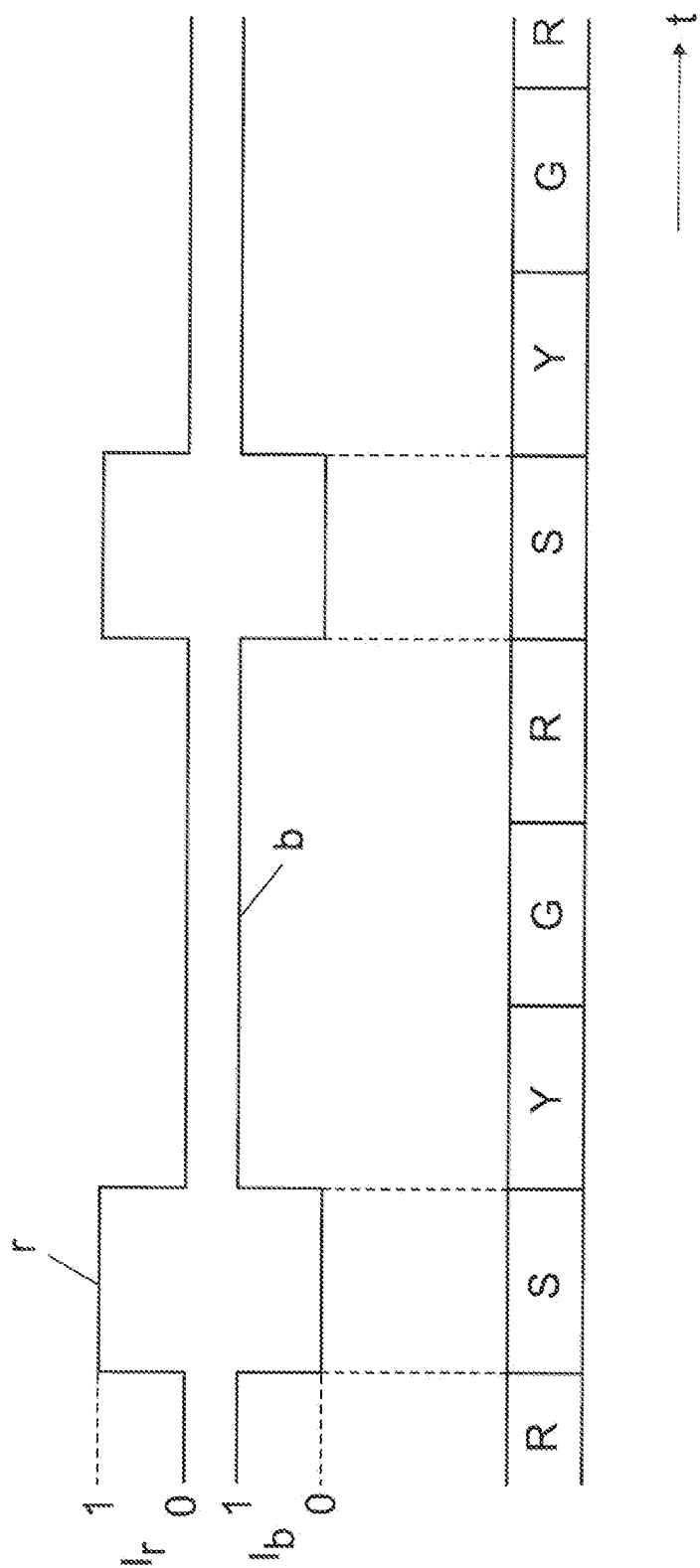
FIG. 3 shows the time profile of the red light, the blue laser radiation and the phosphor segments of the phosphor wheel of the illumination apparatus from FIG. 1.

FIG. 3 shows the temporal sequence of the rotating phosphor wheel 5 with respect to the circular ring sectors S (slit 54), Y (yellow phosphor region 51), G (green phosphor region 52) and R (red phosphor region 53), which rotate through the optical axis. The signal profile at the top shows the normalized intensity profile $I_r$ of the red light r from the red LED 6 which temporally correlates therewith. Shown underneath is the corresponding signal profile $I_b$ of the blue laser radiation b. While the slit sector S rotates through the optical axis, only the red laser diode 6 is switched on ($I_r$=1). The blue laser diode matrix 2, by contrast, is switched off during this phase ($I_b$=0), so that no laser radiation can pass through the slit 54 and strike the red LED 6 and possibly damage it. While the three phosphor sectors Y, G, R thereafter rotate in sequence through the optical axis, the red LED 6 may be switched off ($I_r$=0) for energy efficiency reasons, and only the blue laser diode matrix 2 is switched on ($I_b$=1). The blue laser radiation b is converted by the corresponding phosphors from the three phosphor sectors Y, G, R one after the other into yellow, green and red light. Suitable phosphors are for example:

Red phosphor (R): $CaAlSiN_3:Eu$,
Green phosphor (G): $YAG:Ce(Y_{0.96}Ce_{0.04})_3Al_{3.75}Ga_{1.25}O_{12}$,
Yellow phosphor (Y): $(Y_{0.96}Ce_{0.04})_3Al_{3.75}Ga_{1.25}O_{12}$.

The respective wavelength-converted colored light (yellow, green, red) is collected by the converging lens 4 and, using the dichroic mirror 3, coupled into the optical integrator 7 (possibly focused into it using an additional converging lens which is arranged downstream of the dichroic mirror 3). By supplementing the red light from the red phosphor conversion with the red light from the red LED, the light flux which is averaged over time is increased for the red spectral component owing to the slowness of the human eye. In addition, the dominance wavelength for the sum of both red light components is above 600 nm, as is required in particular for video projection. This embodiment is moreover characterized by its simplicity, since only relatively few components are necessary.

Although the previous example was explained on the basis of a red phosphor and a red-light-emitting LED, various embodiments are also applicable to other colored light phosphors, for example to a blue phosphor (first dominance wavelength) in combination with a light source emitting blue light (second dominance wavelength), a green phosphor (first dominance wavelength) in combination with a light source emitting green light (second dominance wavelength) and so on. A combination which is suitable with respect to producing white light is, for example, also a phosphor region with a yellow phosphor with a phosphor region with a blue phosphor (first dominance wavelength) and a blue LED (second dominance wavelength).

Figure 4:
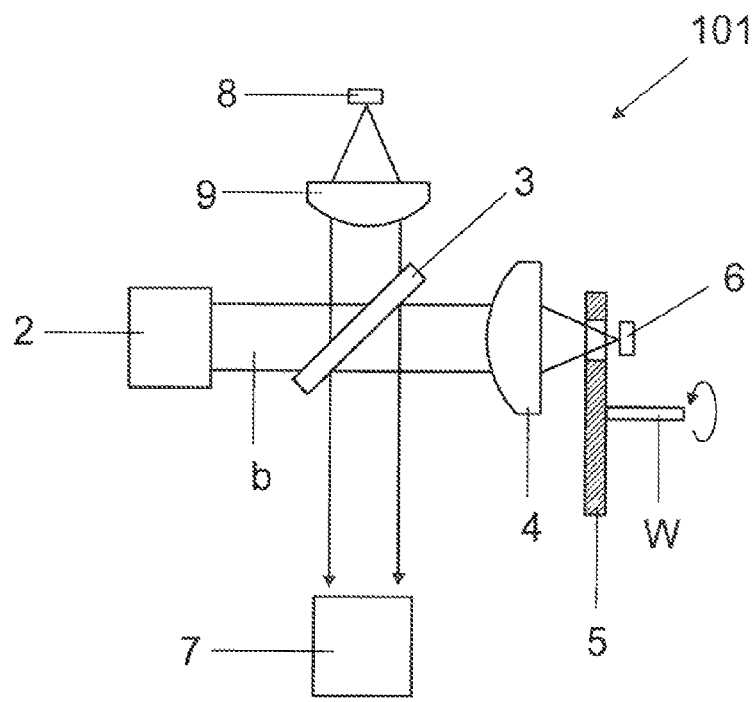
FIG. 4 shows a variant of the illumination apparatus from FIG. 1.

FIG. 4 shows a variant 101 of the illumination apparatus illustrated in FIG. 1 with an additional blue light channel. To this end, a supplementary blue LED 8 is provided. The blue light from the blue LED 8 is focused via a collimator lens 9 onto the dichroic mirror 3. The dichroic mirror 3 lets the blue light from the blue LED 8 pass since, after all, it is adapted for high transmission in the blue spectral range. Afterwards, the blue light passes into the optical integrator 7. The blue LED 8 is operated in a clocked manner, for which an intermediate phase for the blue light is introduced within each complete rotation of the phosphor wheel 2. In this "blue" phase, the blue laser diode matrix 2 can be switched off and/or a phosphor-free sector can be provided on the phosphor wheel 2. This embodiment is suitable for example as an illumination apparatus for a video projector having an imaging unit with the color channels red (r), yellow (y), green (g) and blue (b).

Figure 5:
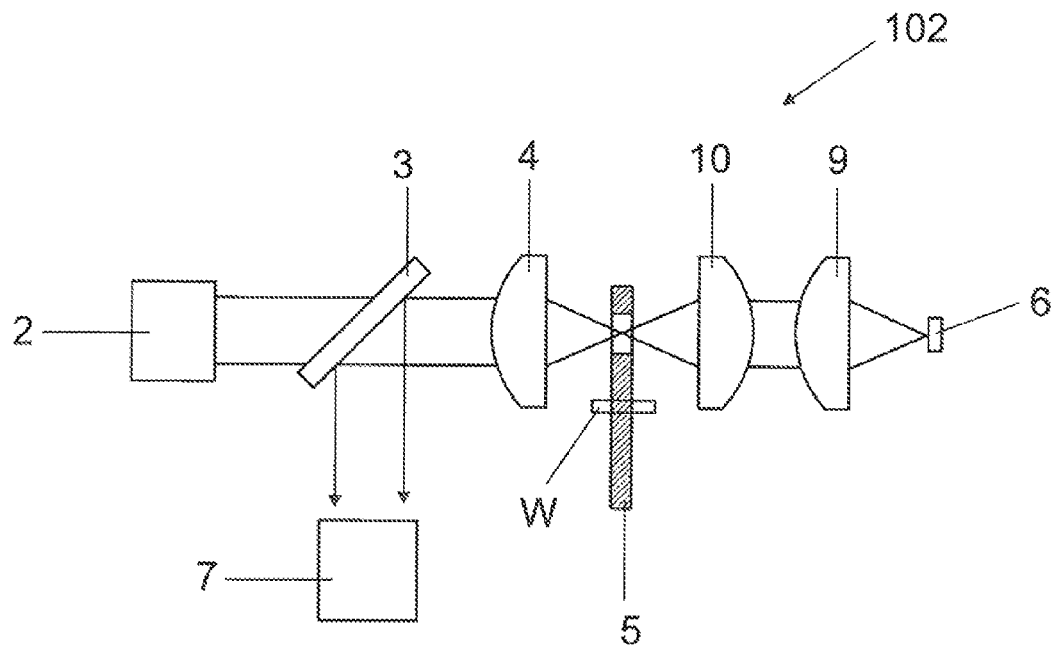
FIG. 5 shows a further variant of the illumination apparatus from FIG. 1.

The illumination apparatus 102 illustrated schematically in FIG. 5 differs from the variant illustrated in FIG. 1 merely in that an optical system, which images the light-emitting surface of the red LED 6 into the plane of the phosphor wheel 2, is arranged between the red LED 6 and the phosphor wheel 2. In addition, a collimator lens 10 is arranged downstream of the red LED 6, which collimator lens shapes the red light from the LED 6 into a quasi-parallel light beam, which is focused by a converging lens 11 into the plane of the phosphor wheel 2. As compared to the simple variant in FIG. 1, this variant has the advantage that the red light from the LED 6 can be shaped more precisely and can thus be coupled, through the slit 54 and via the subsequent converging lens 4 and the dichroic mirror 3, into the optical integrator 7 with fewer losses.

Figure 6:
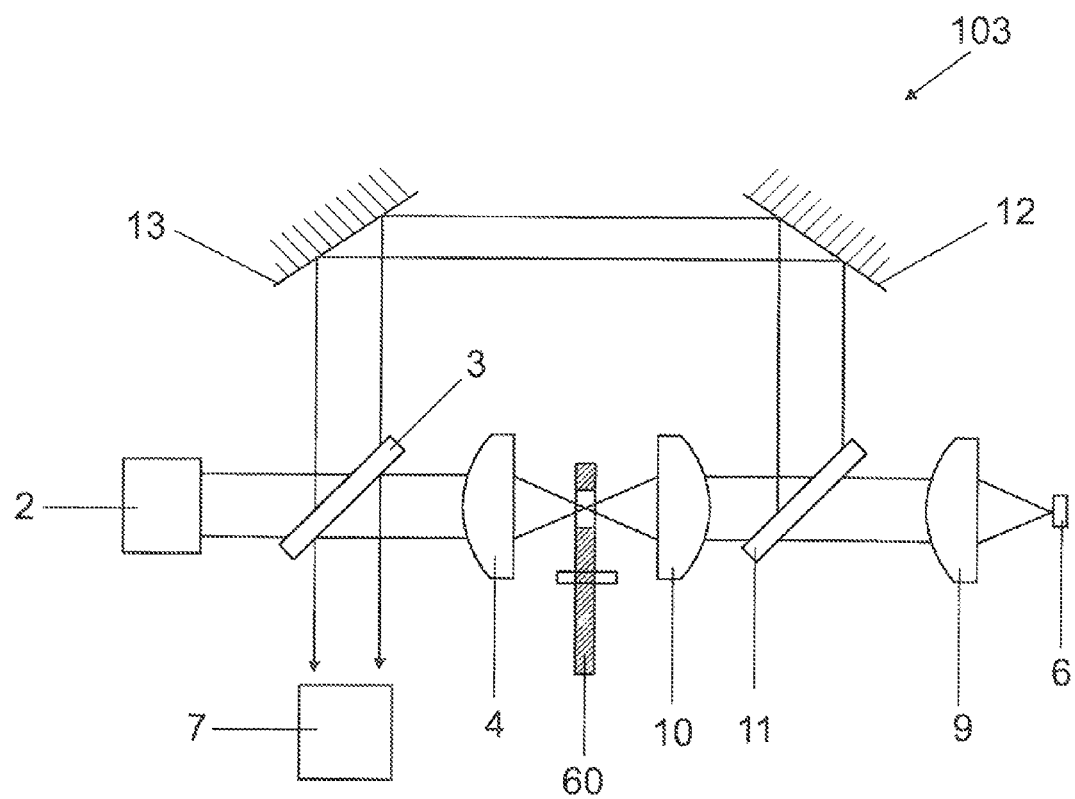
FIG. 6 shows a variant of the illumination apparatus from FIG. 5.
Figure 7:
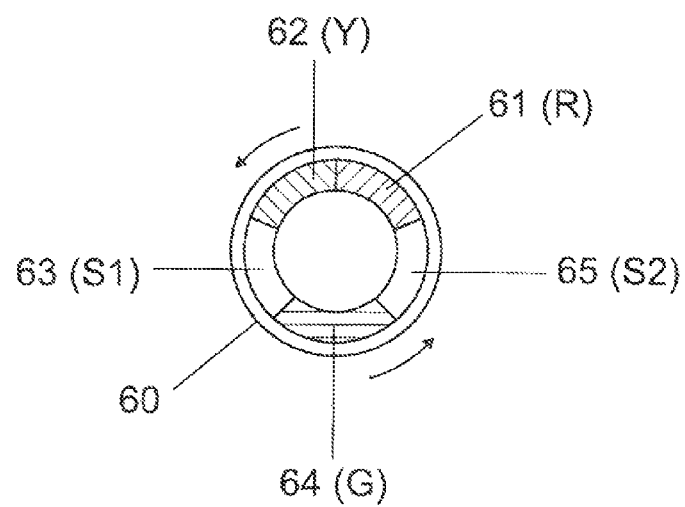
FIG. 7 shows a plan view of a possible embodiment of the phosphor wheel of the illumination apparatus from FIG. 6.

Finally, FIG. 6 shows a further development 103 of the illumination apparatus shown in FIG. 5. In addition, it has what is referred to as a "wrap-around" branch for using the blue laser light as a blue light channel. To this end, a further dichroic mirror 11, which is tilted by 45° with respect to the optical axis, is inserted between the two lenses 9, 10 of the optical system for imaging the red LED 6. The dichroic mirror 11 has high reflection for the blue laser radiation and high transmission for the red light from the LED 6. It is thus possible to couple out the blue laser radiation perpendicular to the optical axis and to deflect it around the phosphor wheel 60 back onto the first dichroic mirror 3 using two 45° mirrors ("wrap-around"). Since the first dichroic mirror 3 is transmissive for the blue laser radiation, the latter passes into the optical integrator 7 through the first dichroic mirror 3. For further explanation of the operation, reference is also made below to FIG. 7, which shows a possible configuration of the phosphor wheel 60. The phosphor wheel 60 is divided into five adjoining circular ring sectors 61-65. A first slit sector 63 follows the two phosphor sectors 61, 62, followed by a phosphor sector 64 and finally a second slit sector 65. The blue laser diode matrix 2 is switched off only during the first slit sector 63, since this phase is intended, as described in FIG. 5, for the red light from the LED 6. The phosphor sectors 61, 62 and 64 are coated with red phosphor (R), yellow phosphor (Y) and green phosphor (G) and serve, as in FIG. 5, for producing red, yellow and green light. The second slit sector 65 is used to radiate the blue laser radiation through the wrap-around branch and to thus produce the blue (laser) light component. With a complete rotation of the phosphor wheel 60, red light (phosphor conversion), yellow light (phosphor conversion), red light (LED), green light (phosphor conversion) and blue light (laser) are thus produced in succession. This colored light sequence also takes into account, among others, the finding that a less pronounced flicker effect for the human eye occurs in the case of colored light changes of light-dark-light-dark than in the case of light-light-dark-dark.

Various embodiments propose an illumination apparatus (102) having a laser apparatus (2) and a phosphor wheel (5), wherein the phosphor wheel (5) has, in addition to at least one phosphor region for phosphor conversion (colored light having a first dominance wavelength), at least one transmission region for colored light having a second, greater dominance wavelength from a light source (6), e.g. LED. The beam paths from light source (6) and laser apparatus (2) may be arranged collinearly, wherein the phosphor wheel (5) rotates into the common optical axis of the laser apparatus (2) and light source (6). By adding colored light having a greater dominance wavelength, the dominance wavelength of a colored light channel that is required for projection applications can also be obtained with colored light converted using efficient phosphor having a dominance wavelength that is too small.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An illumination apparatus, comprising:
    a phosphor wheel comprising a first side and a second side, wherein the first side has a phosphor region, and wherein the phosphor wheel has a transmission region;
    a laser apparatus for irradiating at least part of the phosphor region on the first side of the phosphor wheel with laser radiation;
    wherein the phosphor region has a phosphor which can be irradiated by the laser radiation and re-emits said laser radiation, at least partially wavelength-converted to colored light having a first dominance wavelength;
    a light source for irradiating the transmission region with colored light having a second dominance wavelength, and
    wherein the second dominance wavelength is greater than the first dominance wavelength.

2. The illumination apparatus of claim 1, wherein the light source is arranged such that the colored light emitted by it can travel through the transmission region of the phosphor wheel to the first side of the phosphor wheel.

3. The illumination apparatus of claim 1, wherein the transmission region is transparent for the colored light from the light source.

4. The illumination apparatus of claim 1, wherein the transmission region is formed as a cutout in the phosphor wheel.

5. A method for operating an illumination apparatus, the illumination apparatus comprising:
    a phosphor wheel comprising a first side and a second side, wherein the first side has a phosphor region, and wherein the phosphor wheel has a transparent region;
    a laser apparatus for irradiating at least part of the phosphor region on the first side of the phosphor wheel with laser radiation;
    wherein the phosphor region has a phosphor which can be irradiated by the laser radiation and re-emits said laser radiation, at least partially wavelength-converted to colored light having a first dominance wavelength;
    a light source for irradiating the transparent region with colored light having a second dominance wavelength, and
    wherein the second dominance wavelength is greater than the first dominance wavelength;

the method comprising:
- irradiating the phosphor region with the laser radiation from the laser apparatus for producing colored light having the first dominance wavelength produced using phosphor conversion; and
- producing colored light having the second dominance wavelength by operating the light source.

6. An illumination apparatus, comprising:
a phosphor wheel comprising a first side and a second side, wherein the first side has a phosphor region, and wherein the phosphor wheel has a transparent region;
a laser apparatus for irradiating at least part of the phosphor region on the first side of the phosphor wheel with laser radiation;
wherein the phosphor region has a phosphor which can be irradiated by the laser radiation and re-emits said laser radiation, at least partially wavelength-converted to colored light having a first dominance wavelength;
a light source for irradiating the transparent region with colored light having a second dominance wavelength, and
wherein the second dominance wavelength is greater than the first dominance wavelength.

7. The illumination apparatus of claim 6,
wherein the second dominance wavelength is at least 1 nm and at most 50 nm greater than the first dominance wavelength.

8. The illumination apparatus of claim 7,
wherein the second dominance wavelength is at least 10 nm and at most 30 nm greater than the first dominance wavelength.

9. The illumination apparatus of claim 6, further comprising:
a dichroic mirror, which is arranged in the beam path of the radiation emitted by the laser apparatus between the laser apparatus and the phosphor wheel;
wherein the dichroic mirror has a high transmittance for the laser radiation and a high reflectance for the colored light having the first dominance wavelength.

10. The illumination apparatus of claim 9,
wherein the dichroic mirror is arranged such that the angle of incidence of the radiation emitted by the laser apparatus is between 30° and 60°.

11. The illumination apparatus of claim 10,
wherein the dichroic mirror is arranged such that the angle of incidence of the radiation emitted by the laser apparatus is approximately 45°.

12. The illumination apparatus of claim 10,
wherein the dichroic mirror has a high reflectance for the colored light having the second dominance wavelength; and
wherein the light source is arranged such that the colored light emitted by it can travel through the transparent region of the phosphor wheel and strike the dichroic mirror.

13. The illumination apparatus of claim 6,
wherein the light source comprises at least one light emitting diode.

14. The illumination apparatus of claim 6,
wherein the transparent region consists of more than one part.

15. The illumination apparatus of claim 6, further comprising:
a focusing apparatus, which is arranged in the beam path of the laser radiation emitted by the laser apparatus between the dichroic mirror and the phosphor wheel.

16. The illumination apparatus of claim 6, further comprising:
at least one additional phosphor region with a phosphor, which is different from the phosphor of the other phosphor region.

17. The illumination apparatus of claim 6, further comprising:
an optical system between light source and phosphor wheel for imaging the light source onto the plane of the phosphor wheel.

18. The illumination apparatus of claim 6, further comprising:
a dichroic mirror between the phosphor wheel and the light source;
wherein the dichroic mirror has a high reflectance for the laser radiation and a high transmittance for the colored light having the second dominance wavelength emitted by the light source.

19. The illumination apparatus of claim 6, wherein the transmission region is formed as a cutout in the phosphor wheel.

20. The illumination apparatus of claim 6,
wherein the light source is arranged such that the colored light emitted by it can travel through the transparent region of the phosphor wheel to the first side of the phosphor wheel.

* * * * *